(12) United States Patent
Spratte et al.

(10) Patent No.: US 11,530,744 B2
(45) Date of Patent: Dec. 20, 2022

(54) ROTARY ACTUATOR HAVING A PLURALITY OF STOP ELEMENTS MOVEABLE BY A CAM PLATE

(71) Applicant: ZF Friedrichshafen AG, Friedrichshafen (DE)

(72) Inventors: Joachim Spratte, Osnabrueck (DE); Mario Fischer, Dickel (DE); Bernard Lagemann, Neuenkirchen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/257,077

(22) PCT Filed: Jun. 28, 2019

(86) PCT No.: PCT/EP2019/067368
§ 371 (c)(1),
(2) Date: Dec. 30, 2020

(87) PCT Pub. No.: WO2020/007734
PCT Pub. Date: Jan. 9, 2020

(65) Prior Publication Data
US 2021/0123524 A1    Apr. 29, 2021

(30) Foreign Application Priority Data

Jul. 2, 2018  (DE) .......................... 102018210837.4

(51) Int. Cl.
*F16H 59/08* (2006.01)
*F16H 61/22* (2006.01)
*F16H 61/24* (2006.01)

(52) U.S. Cl.
CPC ............. *F16H 59/08* (2013.01); *F16H 61/22* (2013.01); *F16H 61/24* (2013.01);
(Continued)

(58) Field of Classification Search
CPC ... G05G 1/08; G05G 1/10; G05G 1/12; F16H 59/08; F16H 2059/081; F16H 61/22; F16H 61/24; F16H 2061/223; F16H 2061/243
(Continued)

(56) References Cited

U.S. PATENT DOCUMENTS

| 2006/0037424 A1 | 2/2006 | Pickering et al. |
| 2011/0025488 A1* | 2/2011 | Leon ...................... F16H 59/08 340/456 |

(Continued)

FOREIGN PATENT DOCUMENTS

| DE | 10 2004 041 087 A1 | 3/2006 |
| DE | 10 2005 002 086 B3 | 9/2006 |

(Continued)

OTHER PUBLICATIONS

Office Action dated Feb. 13, 2019 for German Patent Application No. 10 2018 210 837.4, (12 pp.), note: pp. 1 and 2 are English language Explanations to Section C. Result of Determination Document.

(Continued)

*Primary Examiner* — Jake Cook
*Assistant Examiner* — T. Scott Fix
(74) *Attorney, Agent, or Firm* — Crowell & Moring LLP

(57) ABSTRACT

An actuator for activating a plurality of operating functions in a technical system may include one or more of the following: a rotary knob, the rotary knob being rotatable about a rotational axis to an actuation position corresponding to a first operating function of a plurality of operating functions; a first sensor unit, where the actuation position is detectable by the first sensor unit such that a corresponding actuation position signal is sent to a control unit of the technical system causing activation of the first operating
(Continued)

function; a second sensor unit for sending a shut-off signal to the control unit, where the technical system is set to a basic function of the plurality of operating functions upon receipt of the shut-off signal; and at least one sliding track partially encircling the rotary knob radially over an angle of less than 360.

12 Claims, 4 Drawing Sheets

(52) U.S. Cl.
CPC .. *F16H 2059/081* (2013.01); *F16H 2061/223* (2013.01); *F16H 2061/243* (2013.01)

(58) Field of Classification Search
USPC ........................................................ 74/473.3
See application file for complete search history.

(56) References Cited

U.S. PATENT DOCUMENTS

2015/0152958 A1* 6/2015 Watanabe ............... F16H 61/22
                                                                74/473.12
2017/0162347 A1   6/2017 Harazawa et al.
2017/0175884 A1*  6/2017 Watanabe ............... F16H 59/08
2019/0323600 A1* 10/2019 Jiran ....................... F16H 59/08
2020/0166122 A1*  5/2020 Yamamoto .............. F16H 63/40
2020/0191259 A1*  6/2020 Bagley ................. F16H 63/3491

FOREIGN PATENT DOCUMENTS

| EP | 2648062 A2 * | 10/2013 | ............ G05G 1/087 |
| EP | 3 021 009 A1 | 5/2016 | |
| JP | 2017137933 A * | 8/2017 | ............ F16H 61/28 |
| WO | WO 2006/074645 A1 | 7/2006 | |
| WO | WO-2017055898 A1 * | 4/2017 | ............ F16H 59/08 |
| WO | WO 2017/135122 A1 | 8/2017 | |

OTHER PUBLICATIONS

International Search Report and Written Opinion of the International Search Authority dated Sep. 12, 2019 in International Application No. PCT/EP2019/067368 (English and German languages), (11 pp.).

* cited by examiner

ROTARY ACTUATOR HAVING A PLURALITY OF STOP ELEMENTS MOVEABLE BY A CAM PLATE

RELATED APPLICATIONS

This application is a filing under 35 U.S.C. § 371 of International Patent Application PCT/EP2019/067368, filed Jun. 28, 2019, and claiming priority to German Patent Application 10 2018 210 837.4, filed Jul. 2, 2018. All applications listed in this paragraph are hereby incorporated by reference in their entireties.

TECHNICAL FIELD

The present disclosure relates to a rotary actuator for controlling numerous operating functions in a technical system, including a rotary knob that can rotate about a rotational axis to an actuation position corresponding to one of numerous operating functions, and the respective actuating position can be detected by a sensor unit, wherein a corresponding actuating position signal can be sent to a control unit for the technical system and the activated operating function can be carried out, comprising a second sensor unit with which a shut-off signal for the technical system can be detected and sent to the control unit, by means of which the technical system can be set to a basic function of the operating positions, and comprising one or more concentric sliding tracks encircling the rotary knob radially over an angle of less than 360° and delimited by stops, into which stationary stop elements can be moved by an actuation device to limit the angular rotation of the rotary knob, wherein the respective activated operating function can be displayed on a display unit.

BACKGROUND

Certain prior art rotary actuators are used for the manual actuation of the shifting positions forming the operating functions, "P" for parking, "R" for reverse, "N" for neutral, and "D" for drive, in an automatic transmission for motor vehicles. The shut-off signal is triggered through an actuation of the brakes in the motor vehicle, or by a door contact when exiting the motor vehicle, or by an ignition switch when shutting off the ignition for the motor vehicle. The automatic transmission is then shifted from an engaged shifting stage "R" or "D" to the shifting stage "P," although the display indicates the previous shifting stage.

The control electronics then switches the display to the shifting stage "P", wherein a tappet moved into the sliding tracks by electromagnets, which can then bear on the stops, prevents a turning of the locking disk and the rotary knob. When continuing to drive the motor vehicle, the desired shifting stage can be selected by a normal turning of the now unlocked rotary knob, at which point the display then shows the correct shifting stage.

The actuation of the tappet by electromagnets requires a number of electromagnets corresponding to the number of shifting stages, resulting in a high level of complexity. Furthermore, two electromagnets are normally supplied with electricity during operation, resulting in high power consumption and a not insignificant thermal output.

In view of this background, the present disclosure provides an improved rotary actuator of the type described above, that has a simple construction and requires less energy, and only has a low thermal output.

BRIEF DESCRIPTION OF THE DRAWINGS

An exemplary embodiment is shown in the drawings, and shall be described in greater detail below. Therein.

DETAILED DESCRIPTION

Figure 1:
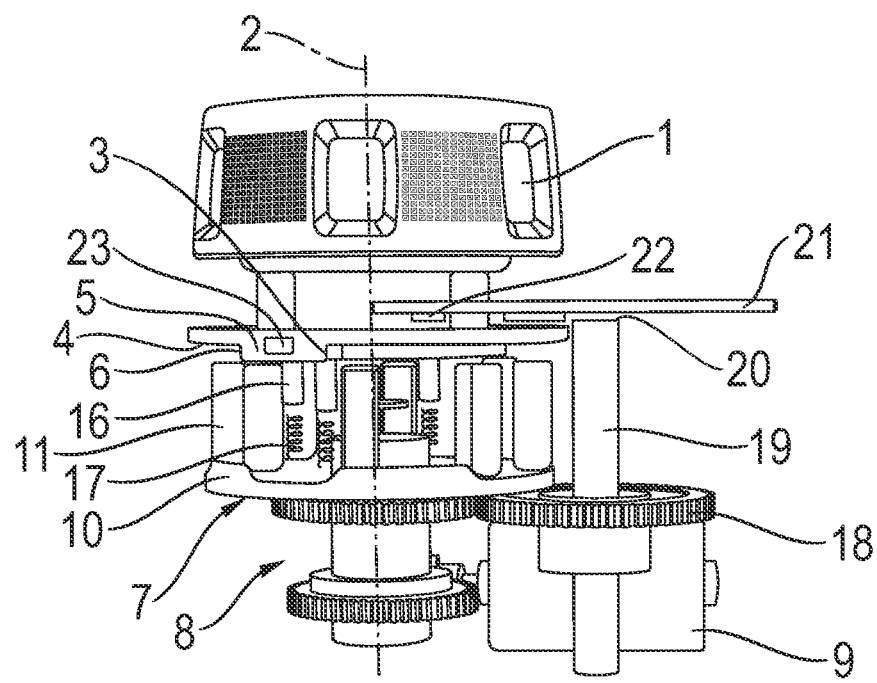
FIG. 1 shows a side view of a rotary actuator.
Figure 2:
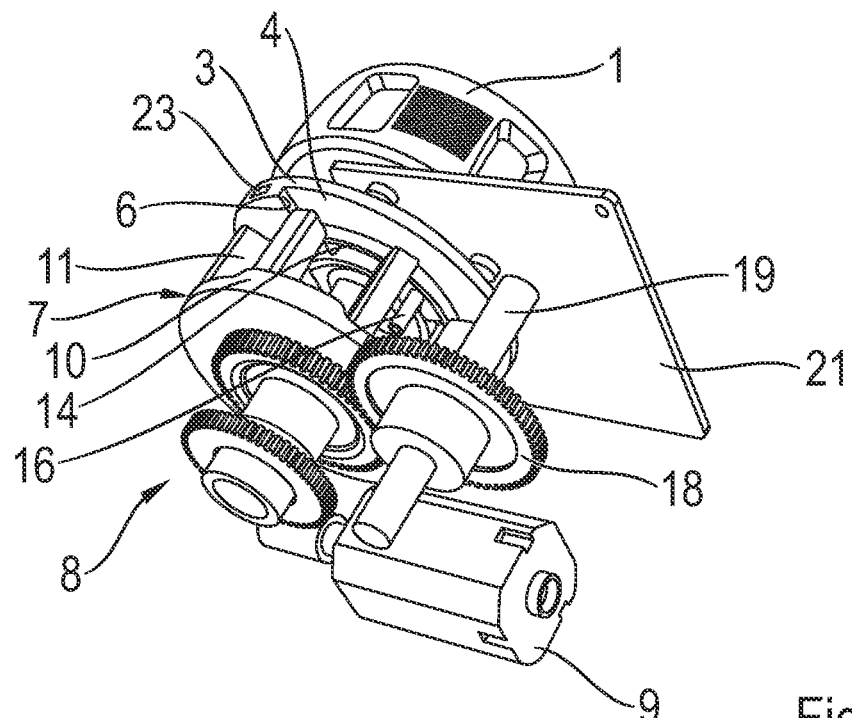
FIG. 2 shows the rotary actuator in FIG. 1 in a perspective view.
Figure 6:
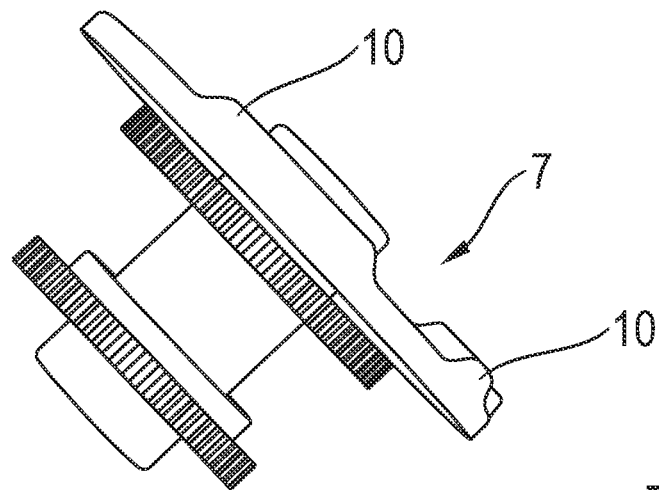
FIG. 6 shows a perspective view of a component comprised of a cam plate and a transmission stage of the rotary actuator according to FIG. 1.
Figure 3:
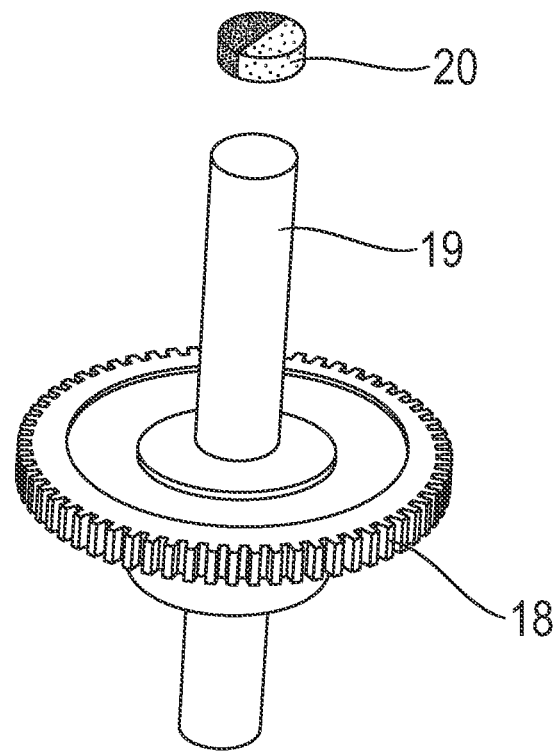
FIG. 3 shows a perspective view of an axle with a gearwheel for the rotary actuator according to FIG. 1.
Figure 4:
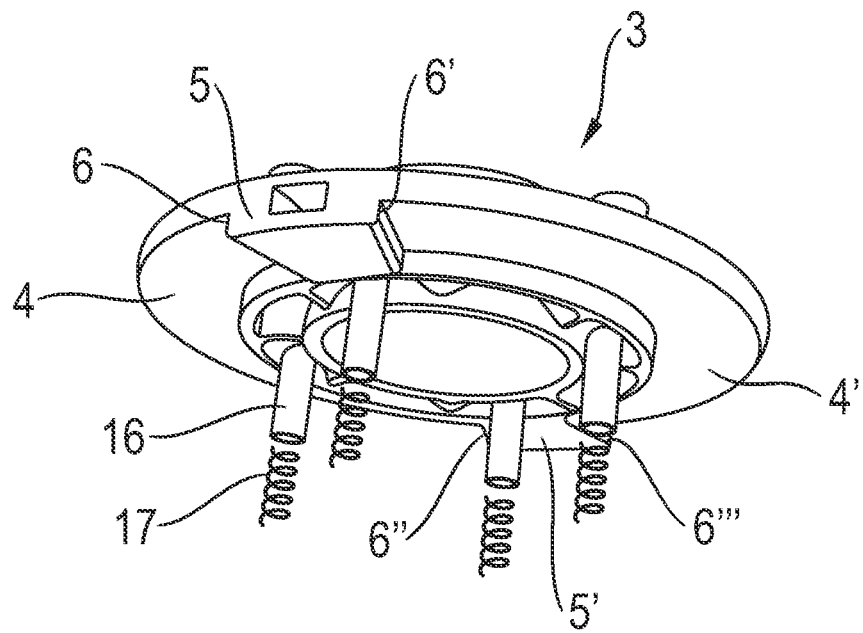
FIG. 4 shows a perspective view of a locking disk in the rotary actuator according to FIG. 1.
Figure 5:
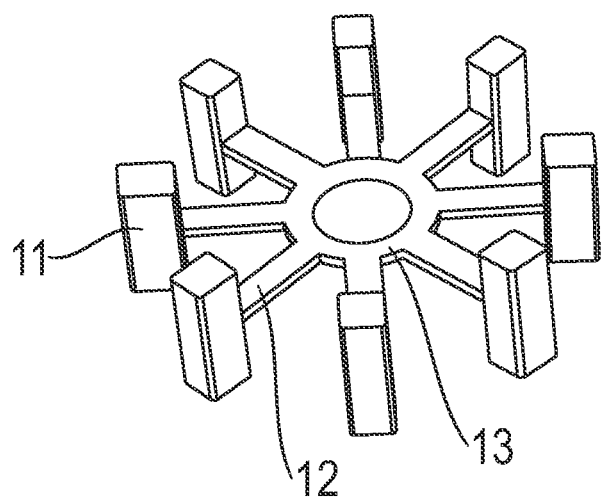
FIG. 5 shows a perspective view of a component comprised of tappets, spring arms, and a retaining ring for the rotary actuator according to FIG. 1.
Figure 7:
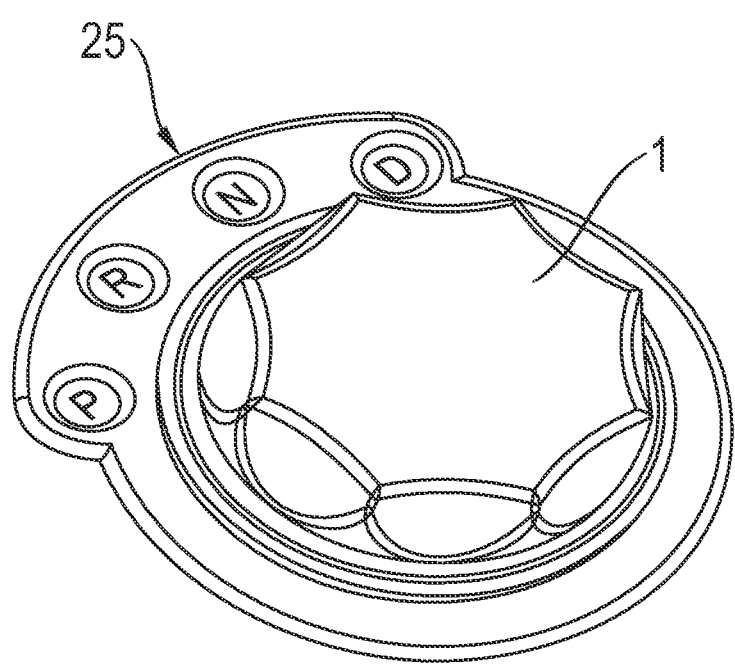
FIG. 7 shows a perspective view of a rotary knob and a display for the rotary actuator according to FIG. 1.

As mentioned in the BACKGROUND section above, the present disclosure provides an improved rotary actuator of the type described above, that has a simple construction and requires less energy, and only has a low thermal output.

In one aspect, this object is achieved using stop elements can be moved by cams on a cam plate from a disengaged position into the sliding tracks counter to a spring force, wherein the cam plate can be rotated by an electric motor, and the respective rotational positions of the cam plate can be detected by a third sensor unit, from which a corresponding rotational position signal can be sent to the control unit.

This embodiment only requires one element, the cam plate for displacing the stop elements, which is powered by a single drive, specifically the electric motor. Because the electric motor is only powered for this displacement, the power consumption and thermal output are low.

To ensure that the rotary knob correctly assumes its actuation position and is retained therein, the rotary knob can have numerous axial notches on a radial circumferential track corresponding to each of the actuation positions, which are evenly distributed over 360° on the circumference, in which one or more axially displaceable latching elements engage, subjected to a spring force in the latching direction, which can be moved from one latching position to another by rotating the rotary knob into the respective adjacent notch.

The stop elements and/or the latching elements can move radially in relation to the rotational axis. A more compact structure is obtained, however, if the stop elements and/or latching elements can move axially in relation to the rotational axis.

Cams can move tappets disengaged from the sliding tracks into the sliding tracks.

If the tappets that are evenly distributed over the circumference are connected via spring arms to a radial, inner retaining ring, which is permanently located on a housing part for the rotary knob, all of the tappets, spring arms, and the retaining ring can form a single component, thus simplifying assembly and reducing the number of components.

By tensioning the spring arms, the tappets can be pressed against the cam plate.

If the sliding tracks and the radial encompassing track are concentric to one another on the cam plate, assembly is also simplified, installation space is reduced, and the number of components is reduced.

The rotary actuator for activating numerous operating functions in a technical system shown in the figures contains a rotary knob 1 that can be rotated about a rotational axis 2 to an actuation position corresponding to one of numerous operating functions.

The rotary actuator in the figures is used for manual actuation of the shifting stages, "P" for parking, "R" for reverse, "N" for neutral, and "D" for drive, forming the operating functions in an automatic transmission for motor vehicles.

A locking disk 3 is permanently attached to the undersurface of the rotary knob 1, which has two radial circumferential sliding tracks 4 and 4' of the same diameter. The two sliding tracks 4 and 4' are separated at their ends by protruding stop cams 5, 5', which form stops 6 and 6" for the sliding track 4, and stops 6' and 6''' for the sliding track 4'.

A cam plate 7 is concentric to the locking disk 3 at an axial distance thereto, which can be rotated by an electric motor 9 via a transmission stage 8.

The cam plate 7 has numerous cams 10 protruding toward the locking disk 3 on a circumferential radial track lying axially opposite the sliding tracks 4, 4'.

Tappets 11 forming stop elements can be moved axially into the sliding tracks 4, 4' by the cams 10 from position where they are disengaged from the sliding tracks 4, 4'.

The eight tappets 11 are evenly distributed over the circumference and connected via spring arms 12 to a radial inner retaining ring 13, which is permanently attached to a housing, not shown.

The tension of the spring arms 12 pushes the tappets 11 against the cam plate 7.

If the cams 10 move the tappets 11 into one of the sliding tracks 4, 4', the locking disk 3 can be rotated between the stops on the tappets 11 at the two stops 6 and 6" or 6' and 6''' in the sliding tracks 4 or 4', into which the tappet 11 has been moved.

To ensure that the rotary knob 1 is correctly positioned in its actuation position, the locking disk 3 has a concentric radial circumferential track 14 inside the sliding tracks 4, 4', which has a number of axial notches corresponding to each of the actuation positions, which are distributed evenly over 360° on the circumference.

Bolts are axially inserted into guide holes lying axially opposite the track 14 on a housing part, not shown, which form latching elements and are pushed against the track 14 in the latching direction by helical compression springs 17, such that the bolts 16 latch into the notches. When the rotary knob 1 is turned, the bolts 16 that are held in place through the compression of the helical springs 17 disengage therefrom, and latch into the adjacent notch.

Another gearwheel 18 is rotated by the transmission stage 8, which is located on an axle 19 connected to the gearwheel 18 for conjoint rotation.

A diametrical permanent magnet 20 is placed on the end of the axle 19, and a rotational position sensor element 21 is placed within its magnetic field on a stationary printed circuit board 21. The respective rotational position of the axle 19, and therefore, indirectly, that of the cam plate 7, can be detected by the rotational position sensor element 21, and a corresponding first rotational position signal for the cam plate 7 can be generated and sent to a control electronics, not shown.

There is also a Hall sensor 22 on the printed circuit board 21 and a permanent magnet 23 on the locking disk 3. A second rotational position signal is then generated, that corresponds to the position of the permanent magnet 23 in relation to the Hall sensor 22, and sent to the control electronics.

A display 25 for the shifting stages is placed next to the rotary knob 1 on the housing for the rotary actuator, which contains the display elements "P" for parking, "R" for reverse, "N" for neutral, and "D" for drive in an automatic transmission. The display element for the shifting stage that is currently engaged is illuminated by the control electronics.

The control electronics also receive a braking signal from the brakes (not shown) in the motor vehicle, when the brakes are actuated, as well as a shut-off signal from a door contact when exiting the motor vehicle, or from an ignition switch when switching off the ignition for the motor vehicle.

REFERENCE SYMBOLS 1 rotary knob
2 rotational axis
3 locking disk
4 sliding track
4' sliding track
5 stop cam
5' stop cam
6 stop
6' stop
6" stop
6''' stop
7 cam plate
8 transmission stage
9 electric motor
10 cam
11 tappet
12 spring arm
13 retaining ring
14 track
16 bolt
17 helical compression spring
18 gearwheel
19 axle
20 diametrical permanent magnet
21 printed circuit board
22 Hall sensor
23 permanent magnet
25 display

The invention claimed is:

1. An actuator for activating a plurality of operating functions in a technical system, the actuator comprising:
   a rotary knob, the rotary knob being rotatable about a rotational axis to an actuation position corresponding to a first operating function of a plurality of operating functions,
   a first sensor unit, wherein the actuation position is detectable by the first sensor unit such that a corresponding actuation position signal is sent to a control unit of the technical system causing activation of the first operating function;
   at least one sliding track partially encircling the rotary knob radially over an angle of less than 360°, and delimited by a set of stops, wherein the set of stops includes at least one stop element that is movable by a stop actuation device to limit an angular rotation of the rotary knob;
   a radial inner retaining ring at least partially encircling the rotational axis;
   a plurality of stop elements; and a plurality of spring arms that extend radially from the radial inner retaining ring, each spring arm of the plurality of spring arms being fixed to a stop element of the plurality of stop elements, and each spring arm of the plurality of spring arms providing a spring force on a respective stop element in a spring direction, the spring direction being parallel to the rotational axis, wherein the stop elements of the plurality of stop elements are movable by at least one cam on a cam plate from a disengaged position into an engaged position in a direction counter to the spring direction and towards the at least one sliding track, and wherein the cam plate is rotatable by an electric motor, and the respective rotational position of the cam plate is detectable by a second sensor unit configured to send a rotational position signal to the control unit.

2. The actuator according to claim 1, wherein the rotary knob includes a plurality of axial notches on a circumferential track corresponding to the actuation positions, and wherein at least one rotation limit for the rotary knob are changeable based on rotation of the cam plate.

3. The actuator according to claim 2, wherein the stop elements are moveable axially in response to rotation of the cam plate to move the at least one rotation limit.

4. The actuator according to claim 1, wherein the plurality of stop elements are formed by a corresponding plurality of tappets, and wherein each of the tappets is movable by the cams from a disengaged position where the tappets are disengaged from the sliding tracks into an engaged position where the tappets are engaged with the sliding tracks.

5. The actuator according to claim 1, wherein the radial inner retention ring is fixed to a housing part for the actuator.

6. The actuator according to claim 1, wherein the sliding track curves about the rotational axis.

7. An actuator for activating a plurality of operating functions in a technical system, the actuator comprising:
a rotary knob, the rotary knob being rotatable about a rotational axis to an actuation position corresponding to a first operating function of a plurality of operating functions,
at least one sliding track partially encircling the rotary knob radially over an angle of less than 360°, and delimited by a set of stops, wherein the set of stops includes at least one stop element that is movable by a stop actuation device to limit an angular rotation of the rotary knob;
a radial inner retaining ring at least partially encircling the rotational axis;
a plurality of stop elements; and
a plurality of spring arms that extend radially from the radial inner retaining ring, each spring arm of the plurality of spring arms being fixed to a stop element of the plurality of stop elements, and each spring arm of the plurality of spring arms providing a spring force on a respective stop element in a spring direction, the spring direction being parallel to the rotational axis, wherein the stop elements of the plurality of stop elements are movable by at least one cam on a cam plate from a disengaged position into an engaged position in a direction counter to the spring direction and towards the at least one sliding track, and wherein the cam plate is rotatable by an electric motor.

8. The actuator according to claim 7, wherein the rotary knob includes a plurality of axial notches on a circumferential track corresponding to the actuation positions, and wherein at least one rotation limit for the rotary knob are changeable based on rotation of the cam plate.

9. The actuator according to claim 8, wherein the stop elements are moveable axially in response to rotation of the cam plate to move the at least one rotation limit.

10. The actuator according to claim 7, wherein the plurality of stop elements are formed by a corresponding plurality of tappets, and wherein each of the tappets is movable by the cams from a disengaged position where the tappets are disengaged from the sliding tracks into an engaged position where the tappets are engaged with the sliding tracks.

11. The actuator according to claim 7, wherein the radial inner retention ring is fixed to a housing part for the actuator.

12. The actuator according to claim 7, wherein the sliding track curves about the rotational axis.

\* \* \* \* \*